Patented Apr. 30, 1946

2,399,354

UNITED STATES PATENT OFFICE 2,399,354

ISOMERIZATION

John Kellett, III, Milton M. Marisic, and Arlie A. O'Reilly, Woodbury, N. J., assignors to Socony-Vacuum Oil Company, Incorporated, a corporation of New York No Drawing. Application January 29, 1944, Serial No. 520,316

5 Claims. (Cl. 260—683.5)

This invention relates to vapor phase isomerization of saturated paraffin hydrocarbons and is particularly concerned with conversion of saturated hydrocarbons having straight or slightly branched chains to isomers thereof having a higher degree of chain branching.

The utilization of isoparaffins for alkylation reactions involving condensation with olefins in the presence of a catalyst and the increased need of higher octane fuels has encouraged interest in processes of isomerization. Of particular interest are conversions of normal butane to isobutane to be used in alkylation and conversion of low octane value hydrocarbons to more highly branched-chain hydrocarbons of better fuel value. In the latter category, it may be mentioned that isopentane is a very valuable component of aviation fuels and isomerization of normal heptanes and octanes for fuel purposes is also of major interest. The present invention provides a commercially practicable process for conversion of saturated hydrocarbons in general, having four or more carbon atoms per molecule, to isomers of the material charged. It is, of course, preferable to charge a straight-chain or slightly branched-chain hydrocarbon at the present time since the value of these hydrocarbons as fuels is closely related to the degree of chain branching.

The majority of the processes proposed for commercial operation involve the use of metal halides, particularly aluminum chloride and aluminum bromide as catalysts. Reaction times required by these catalysts are unduly long and the catalyst is rapidly contaminated to a stage where it is no longer economically effective. Regeneration of such catalysts as such is impossible at the present time, although the aluminum may be recovered and converted again to the chloride. It has been proposed to utilize metals of the iron group deposited on specially treated clay. This process also requires fairly long contact times and the regeneration of any catalyst having a metallic element as an essential constituent requires an expensive reduction step such as high temperature treatment with hydrogen.

According to the present invention, the hydrocarbons to be converted are contacted in vapor phase with an inorganic oxide adsorbent material having a substantially high cracking activity as measured by conversion of gas oil under moderate cracking conditions. The temperatures employed according to the present invention are in the neighborhood of the minimum temperature at which cracking of the hydrocarbon to be isomerized will be initiated in the presence of cracking catalyst used.

It is essential to the success of the operation that substantial super-atmospheric pressures be applied. In general, the pressures at which the process is operative are in excess of 500 pounds per square inch, preferably 700 to 1000 pounds per square inch. It appears that extremely high pressures do not materially aid the course of the isomerization reaction, but, on the other hand, no detrimental effect of such high pressures has been found. It appears that maximum pressures for the process are dictated primarily by limitations of the apparatus used.

The catalyst may be any of the known adsorbent compositions which consist essentially of inorganic oxides, such as silica, alumina, thoria, ceria, beryllia and the like, preferably in the form of combinations of two or more oxides. Of these compositions, silica alumina is typical, and since this combination has been the most extensively studied for cracking reactions, it will be treated hereinafter as typical of the operative catalysts. It is to be understood, however, that any of the other inorganic oxide cracking catalysts conforming to the definitions hereinafter may be utilized in the same manner as silica alumina.

The catalyst may be either a natural or synthetic composition, for example, the natural clays which have been activated to give them substantial cracking activity. Among the synthetic catalysts suitable for the present invention, a distinction must be recognized between precipitates on the one hand and gels on the other. In general, the gels have a considerably higher activity than do corresponding precipitates. Preparation of the synthetic catalyst, under such conditions that precipitate will be formed and included in a subsequent gel, will result in decrease in activity commensurate with the amount of precipitate formed. Preferably, a true gel catalyst is used and superior results are obtained when that catalyst is formed in accordance with copending application Serial No. 461,454, filed October 9, 1942, by Milton M. Marisic. According to that prior application, a gelable sol having a pH of 2.5 to 10 is extruded into the top of a column of oil wherein it separates into globules. The globules set to a firm hydrogel while falling through the oil and are removed as hydrogel spheroids which are then washed with water, base-exchanged to remove alkali metals, dried and heat treated at temperatures upwards of 1000° F.

The catalyst to be used according to the present invention should have a cracking activity of at least 25% as measured by conversion of Oklahoma City Gas Oil having an A. P. I. gravity of 35.8 and a boiling range of 471° to 708° F. to gasoline having an end point of 410° F. by passing said gas oil through said catalyst at 800° F., substantially atmospheric pressure and a liquid feed rate of 1.5 volumes of said gas oil per volume of catalyst per hour for twenty-minute periods between regenerations.

The activity of catalyst for isomerization of paraffin hydrocarbons seems to be parallel to the cracking activity. In general, the contact time will vary inversely as the temperature employed—temperatures of about 700° to 1000° F. being suitable for most purposes. The conditions should be adjusted in order to obtain a good yield of the desired isomers and this result will be obtained if the pressure is not substantially below 500 pounds per square inch at a temperature not substantially below that at which cracking of the hydrocarbon charge is initiated in the presence of the catalyst employed. For many purposes, substantial cracking is not particularly undesirable since the degradation products are largely isoparaffins and therefore valuable in many hydrocarbon syntheses. As the art well knows, the resistance of paraffins to cracking is related to the molecular weight—the higher paraffins cracking at a substantially lower temperature than hydrocarbons having a lesser number of carbon atoms.

In general, it is desirable that the charge stock undergoing the isomerization reaction, according to this invention, shall be of relatively narrow boiling range in order that the conditions may be controlled to give maximum conversions of each constituent. Thus, we prefer that the highest boiling hydrocarbon and the lowest boiling hydrocarbon forming substantial portions of the charge stock shall not differ by more than one carbon atom.

The advantages of the invention and the manner in which isomerization yields vary with cracking activity will be apparent from the following specific examples:

EXAMPLE I

Catalyst No. 1 is a hydrated silica-alumina composition having a molar ratio of silica to alumina of 12 to 1. This catalyst was prepared by mixing a solution of sodium aluminate and sodium silicate with a solution of ammonium sulfate to form a gelatinous precipitate having a pH of 9.5. The precipitate was dried to a water content of 20%, then ground to a powder, washed free of soluble salts, base-exchanged with ammonium chloride solution, washed again, dried, pelleted and finally heat treated at 1050° F. for six hours.

EXAMPLE II

Catalyst 2 is a hydrated silica alumina gel having a molar ratio of silica to alumina of 20 to 1. The gel was prepared by mixing solutions of sodium silicate, aluminum sulfate and hydrochloric acid to form a sol having a pH of 0.27, which, on standing, set to a hydrogel. The hydrogel was broken into particles of about one inch in diameter and washed until free of acid and soluble salts, then dried at 180° F. to constant weight and gradually heated to 1050° F. at which temperature the gel was maintained for four hours. The gel catalyst was in the form of fragments of 6 to 14 mesh size.

EXAMPLE III

Catalyst 3 is a hydrated silica-alumina gel having a molar ratio of silica to alumina of 16 to 1. This catalyst was prepared in the form of spheroidal particles by mixing solutions of sodium silicate, aluminum sulfate and sulfuric acid to form a colloidal solution having a pH of 8.5 and a gelation time of 5 seconds. The sol prior to gelation was extruded into oil to form hydrogel beads, which were washed with water at 95° F. until free of soluble salts, base-exchanged with aluminum sulfate solution, washed again, dried and heat treated at 1100° F. for four hours.

EXAMPLE IV

Catalyst 4 was prepared in a manner similar to the description for catalyst 3. The essential difference between the two catalysts was a more drastic heat treatment applied to the former catalyst, which consisted of passing a mixture of 5% steam and 95% air over the catalyst at a temperature of 1425° F. for ten hours. The chemical composition of the two catalysts is the same.

EXAMPLE V

Catalyst 5 is a hydrated silica-alumina gel having a molar ratio of silica to alumina of 55 to 1. This catalyst was prepared in bead form from solutions of sodium silicate, sodium aluminate and sulfuric acid. The pH of the colloidal solution was 5.4 and the gelation time was twenty seconds. The hydrogel beads were processed in the same manner as catalyst 3 except that temperature of the wash water was 70° F. and the base-exchange material was $NH_4Cl$.

Data on the isomerization of normal pentane over each of the above catalysts is shown in the following table:

TABLE 1

High temperature-pressure isomerization data—the isomerization of n-pentane

| | Catalyst | | Operation conditions | | | | | Pod. analysis of liquid product, vol. per cent | | | | | | | |
|---|---|---|---|---|---|---|---|---|---|---|---|---|---|---|---|
| No. | Cracking activity | Apparent density | Temp., °F. | Pressure, lbs. gs. | Space velocity | On-stream time, min. | Contact time, min. | Propane | Isobutane | Isobutene | 1 and 2 butenes | n-Butane | Isopentane | Normal pentane | Residue |
| 1 | Per cent 47 | 0.550 | 875 | 1,000 | 1.0 | 120 | 8.3 | | | (¹) ² 4.1 | | | 8.0 | 89.7 | 5.1 |
| 2 | 19 | 0.675 | 925 | 1,000 | 1.0 | 40 | 8.0 | | | ² 3.0 | | | 1.1 | 73.9 | 1.6 |
| 3 | 49 | 0.740 | 875 | 1,000 | 1.0 | 120 | 8.3 | | | | | 2.5 | 21.5 | 69.1 | 2.4 |
| 4 | 50 | 0.862 | 900 | 1,000 | 1.0 | 45 | 8.1 | 0.8 | 3.2 | 0.1 | 0.1 | 2.0 | 22.0 | 65.2 | 5.5 |
| 5 | 50 | 0.862 | 875 | 1,000 | 1.0 | 120 | 8.3 | 0.8 | 2.7 | | | | 23.6 | (¹) | |
| 6 | 47 | 0.910 | 850 | 1,000 | 1.0 | 120 | 8.5 | | | | | | 20.0 | (¹) | |

¹ Undetermined.
² Total degradation products.

We claim:

1. A process for the isomerization of paraffin hydrocarbons having at least four carbon atoms per molecule to isomers thereof having the same number of carbon atoms but different chain structure with only minor decomposition of said paraffin hydrocarbons to hydrocarbons having a different number of carbon atoms which comprises vaporizing a mixture of hydrocarbons wherein the highest boiling and the lowest boiling hydrocarbon present in substantial amounts differ by not more than one carbon atom and contacting the hydrocarbon vapor at a temperature of about 700° to about 1000° F. and a pressure not substantially below 500 lbs. per square inch with a solid porous adsorbent contact mass consisting substantially of inorganic oxides and having a cracking activity of at least about 25% as measured by percentage conversion of Oklahoma City Gas Oil having an A. P. I. gravity of 35.8 and a boiling range of 471° to 708° F. to gasoline having an end point of 410° F. by passing said gas oil through said catalyst at 800° F., substantially atmospheric pressure and a liquid feed rate of 1.5 volumes of said gas oil per volume of catalyst per hour for periods of twenty minutes between regenerations; said temperature being in the neighborhood of the minimum temperature at which cracking of the said paraffin hydrocarbons will be initiated in the presence of said catalyst; thereafter removing hydrocarbons from contact with said catalyst and separating therefrom isomers of the paraffin hydrocarbons contacted with said catalyst as aforesaid.

2. A process for the isomerization of paraffin hydrocarbons having at least four carbon atoms per molecule to isomers thereof having the same number of carbon atoms but different chain structure with only minor decomposition of said paraffin hydrocarbons to hydrocarbons having a different number of carbon atoms which comprises vaporizing a mixture of hydrocarbons wherein the highest boiling and the lowest boiling hydrocarbon present in substantial amounts differ by not more than one carbon atom and contacting the hydrocarbon vapor at a temperature of about 700° to about 1000° F. and a pressure not substantially below 500 lbs. per square inch with a solid porous adsorbent contact mass consisting substantially of silica and at least one metal oxide and having a cracking activity of at least about 25% as measured by percentage conversion of Oklahoma City Gas Oil having an A. P. I. gravity of 35.8 and a boiling range of 471° to 708° F. to gasoline having an end point of 410° F. by passing said gas oil through said catalyst at 800° F., substantially atmospheric pressure and a liquid feed rate of 1.5 volumes of said gas oil per volume of catalyst per hour for periods of twenty minutes between regenerations; said temperature being in the neighborhood of the minimum temperature at which cracking of the said paraffin hydrocarbons will be initiated in the presence of said catalyst; thereafter removing hydrocarbons from contact with said catalyst and separating therefrom isomers of the paraffin hydrocarbons contacted with said catalyst as aforesaid.

3. A process for the isomerization of paraffin hydrocarbons having at least four carbon atoms per molecule to isomers thereof having the same number of carbon atoms but different chain structure with only minor decomposition of said paraffin hydrocarbons to hydrocarbons having a different number of carbon atoms which comprises vaporizing a mixture of hydrocarbons wherein the highest boiling and the lowest boiling hydrocarbon present in substantial amounts differ by not more than one carbon atom and contacting the hydrocarbon vapor at a temperature of about 700° to about 1000° F. and a pressure not substantially below 500 lbs. per square inch with a solid porous adsorbent contact mass consisting substantially of a dried gel of inorganic oxides and having a cracking activity of at least about 25% as measured by percentage conversion of Oklahoma City Gas Oil having an A. P. I. gravity of 35.8 and a boiling range of 471° to 708° F. to gasoline having an end point of 410° F. by passing said gas oil through said catalyst at 800° F., substantially atmospheric pressure and a liquid feed rate of 1.5 volumes of said gas oil per volume of catalyst per hour for periods of twenty minutes between regenerations; said temperature being in the neighborhood of the minimum temperature at which cracking of the said paraffin hydrocarbons will be initiated in the presence of said catalyst; thereafter removing hydrocarbons from contact with said catalyst and separating therefrom isomers of the paraffin hydrocarbons contacted with said catalyst as aforesaid.

4. A process for the isomerization of paraffin hydrocarbons having at least four carbon atoms per molecule to isomers thereof having the same number of carbon atoms but different chain structure with only minor decomposition of said paraffin hydrocarbons to hydrocarbons having a different number of carbon atoms which comprises vaporizing a mixture of hydrocarbons wherein the highest boiling and the lowest boiling hydrocarbon present in substantial amounts differ by not more than one carbon atom and contacting the hydrocarbon vapor at a temperature of about 700° to about 1000° F. and a pressure not substantially below 500 lbs. per square inch with a solid porous adsorbent contact mass consisting substantially of a dried gel of silica and at least one metal oxide and having a cracking activity of at least about 25% as measured by percentage conversion of Oklahoma City Gas Oil having an A. P. I. gravity of 35.8 and a boiling range of 471° to 708° F. to gasoline having an end point of 410° F. by passing said gas oil through said catalyst at 800° F., substantially atmospheric pressure and a liquid feed rate of 1.5 volumes of said gas oil per volume of catalyst per hour for periods of twenty minutes between regenerations; said temperature being in the neighborhood of the minimum temperature at which cracking of the said paraffin hydrocarbons will be initiated in the presence of said catalyst; thereafter removing hydrocarbons from contact with said catalyst and separating therefrom isomers of the paraffin hydrocarbons contacted with said catalyst as aforesaid.

5. A process for the isomerization of paraffin hydrocarbons having at least four carbon atoms per molecule to isomers thereof having the same number of carbon atoms but different chain structure with only minor decomposition of said paraffin hydrocarbons to hydrocarbons having a different number of carbon atoms which comprises vaporizing a mixture of hydrocarbons wherein the highest boiling and the lowest boiling hydrocarbon present in substantial amounts differ by not more than one carbon atom and contacting the hydrocarbon vapor at a temperature of about 700° to about 1000° F. and a pressure not substantially below 500 lbs. per square inch with a solid porous adsorbent contact mass consisting substantially of a dried gel of silica and alumina and having a cracking activity of at least about 25% as measured by percentage conversion of Oklahoma City Gas Oil having an A. P. I. gravity of 35.8 and a boiling range of 471° to 708° F. to gasoline having an end point of 410° F. by passing said gas oil through said catalyst at 800° F., substantially atmospheric pressure and a liquid feed rate of 1.5 volumes of said gas oil per volume of catalyst per hour for periods of twenty minutes between regenerations; said temperature being in the neighborhood of the minimum temperature at which cracking of the said paraffin hydrocarbons will be initiated in the presence of said catalyst; thereafter removing hydrocarbons from contact with said catalyst and separating therefrom isomers of the paraffin hydrocarbons contacted with said catalyst as aforesaid.

JOHN KELLETT, III.
MILTON M. MARISIC.
ARLIE A. O'KELLY.